Feb. 17, 1970  P. R. MONSLER  3,495,772
ADDING AND SUBTRACTING DEVICE
Filed Jan. 22, 1969  3 Sheets-Sheet 1
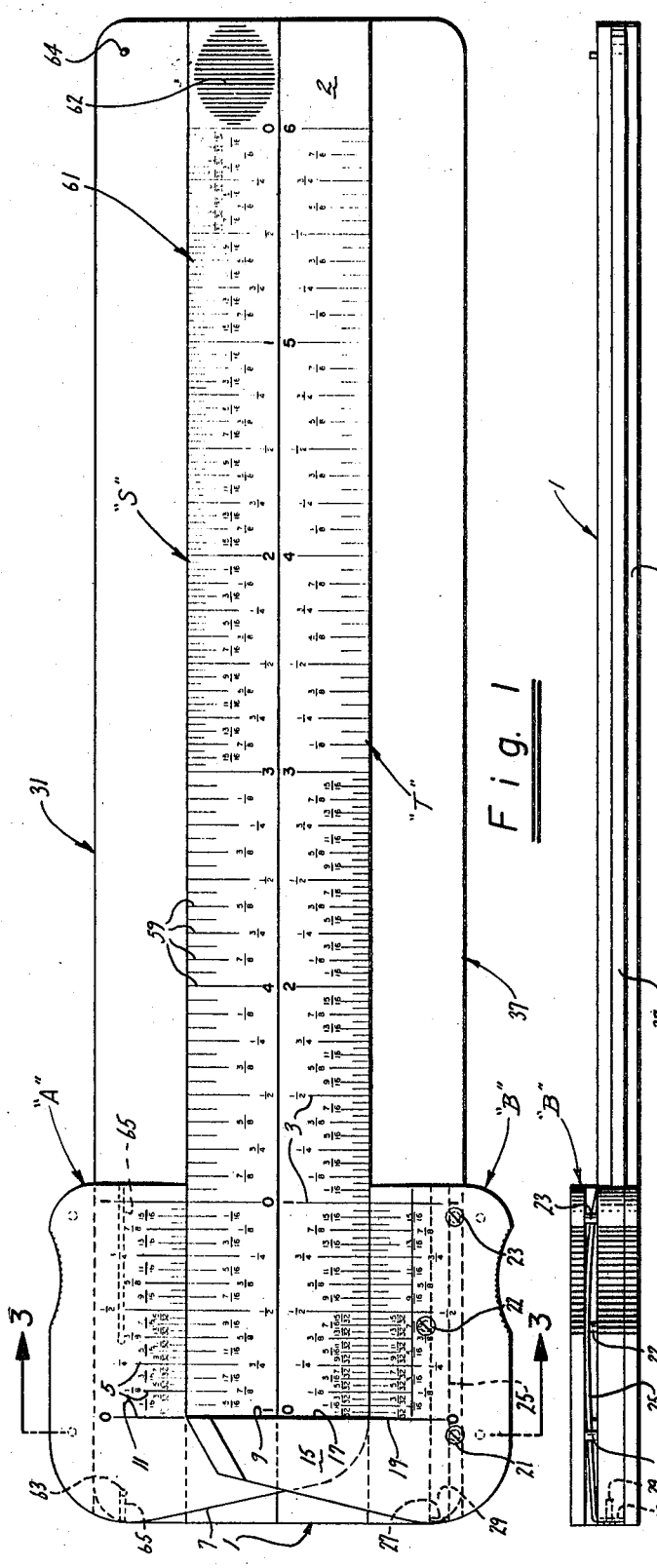
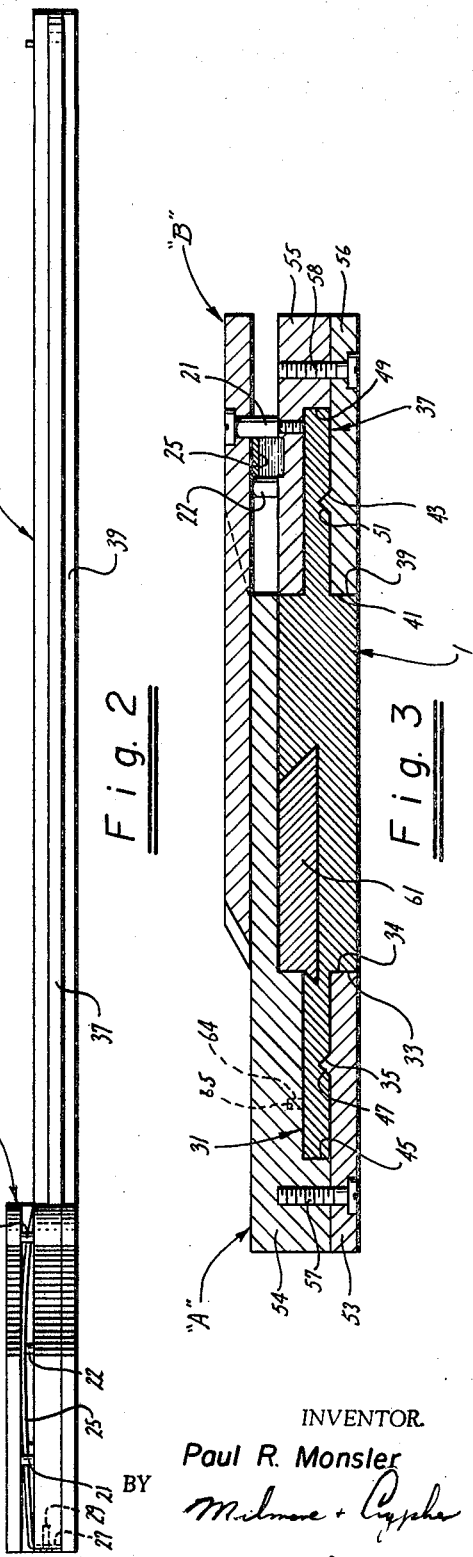
INVENTOR.
Paul R. Monsler
BY
Attorneys Feb. 17, 1970  P. R. MONSLER  3,495,772
ADDING AND SUBTRACTING DEVICE
Filed Jan. 22, 1969  3 Sheets-Sheet 2
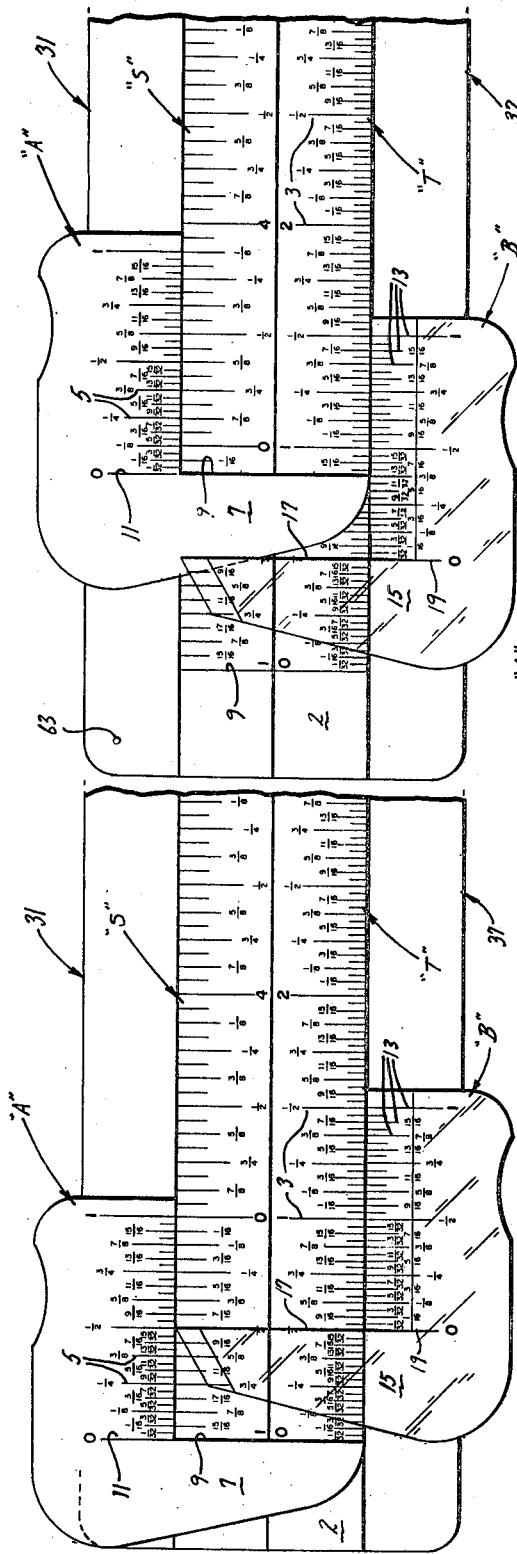
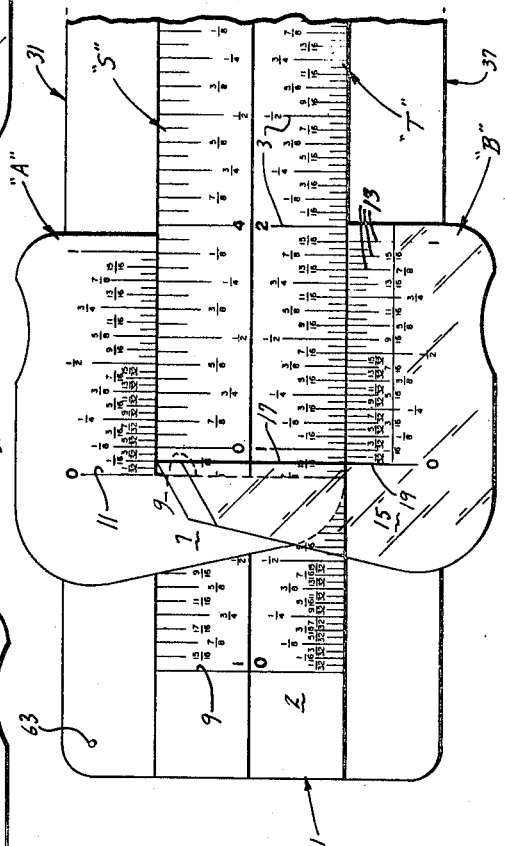
INVENTOR.
Paul R. Monsler
BY
Attorneys

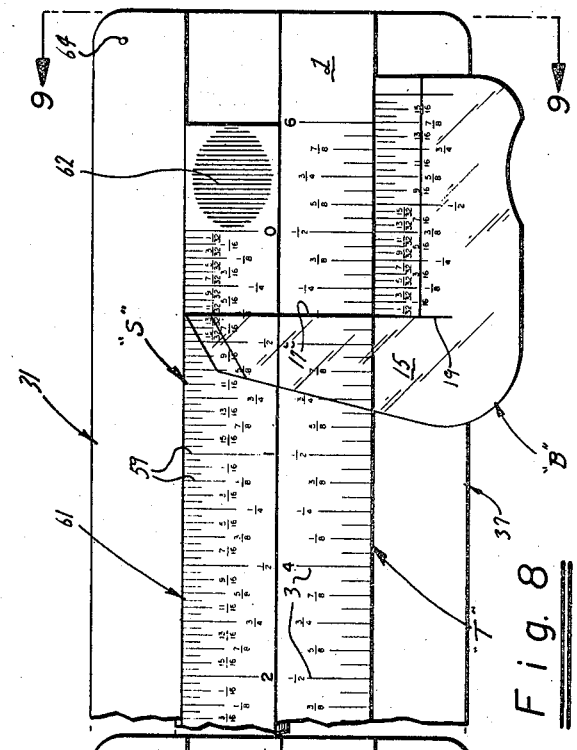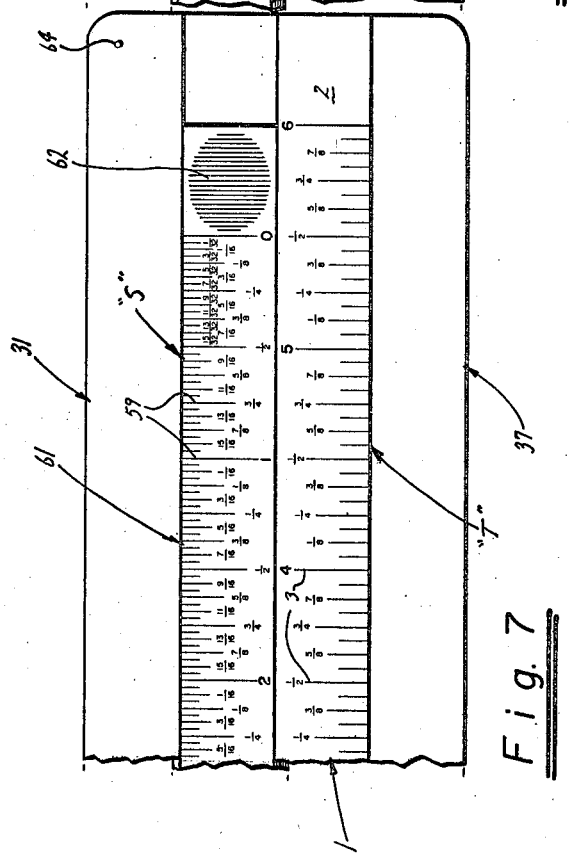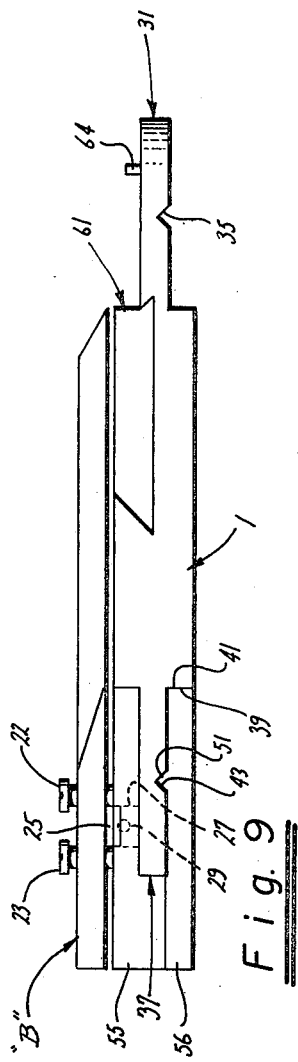

United States Patent Office 3,495,772
Patented Feb. 17, 1970

3,495,772
ADDING AND SUBTRACTING DEVICE
Paul R. Monsler, 3230 Garfield Ave.,
Alameda, Calif. 94501
Filed Jan. 22, 1969, Ser. No. 793,015
Int. Cl. G06g 1/02
U.S. Cl. 235—70                              10 Claims

ABSTRACT OF THE DISCLOSURE

A device for adding and substracting fractions consisting of a base presenting a scale, a first slide having a projection overlapping said scale and having at least one unit of said scale divided into fractions of said unit, and a second slide having a projection overlapping said scale and in close proximity to the scale on said first slide, and being formed with at least one unit of said scale and positioned for reading by said first projection.

Background of the invention

Sheet metal workers, pattern makers and others who must make objects or models from design plans are constantly faced with adding or substracting several numbers containing fractions with different denominators. It is time consuming to find the least common denominator, multiply the numerators, add or subtract the numerators and then reduce the fraction to a denominator that appears on the workmen's scale.

Prior to the present invention, there was no known device for obtaining the correct answer without going through the above mathematical process.

Summary of the invention

The gist of the present invention is the use of a device which can add or substract fractions merely by sliding a pair of slides along a scale in which each slide is formed with a pointer and a scale divided into fractions.

An object of the invention is to eliminate all mathematical processes necessary to add or subtract fractions having different denominators except the necessity to read a scale and the fractions thereon.

Another object is to provide a device which is small, inexpensive, durable, simple to learn to use and which is accurate and reliable, and will reduce or eliminate human error.

Brief description of the drawings

FIGURE 1 is a front view of the device constructed in accordance with the present invention.

FIGURE 2 is a side elevation view of the device shown in FIGURE 1.

FIGURE 3 is an enlarged cross sectional view of the device taken along line 3—3 of FIGURE 1.

FIGURE 4 is a front view of a portion of the device of FIGURE 1 with the slide mechanism in position for adding the fraction ½.

FIGURE 5 is a front view of a portion of the device of FIGURE 1 with the slides positioned to add the fractions ½ and ⅜.

FIGURE 6 is a front view of a portion of the device of FIGURE 1 with the slides positioned to add the fractions ½, ⅜ and 1/16.

FIGURE 7 is a front view of a portion of the device of FIGURE 1 with the S scale positioned to substract a number in which the fraction ½ occurs in the minuend.

FIGURE 8 is a front view of a portion of the device of FIGURE 1 with the slide positioned to subtract a number in which the fraction ⅜ occurs in the subtrahend.

FIGURE 9 is an end elevation view of the device as seen from the right end of FIGURE 1 with portions removed and with the movable portion partially depressed.

Description of the preferred embodiments

The invention consists briefly of an elongated base member 1 having a primary surface 2 for presenting linearly spaced indicia marks 3 forming a measurement scale of a plurality of units and fractions thereof; a first slide A mounted on the elongated base member for parallel, coextensive movement along said scale and having linearly spaced indicia marks 5 forming at least one unit of the measurement scale and fractions thereof and being formed with a projection 7 overlapping the measurement scale, the projection carrying an elongated index mark 9 registering with a unit mark 11 on the first slide; a second slide B mounted on the elongated base member for parallel, coextensive movement along the scale and having linearly spaced indicia marks 13 forming at least one unit of the measurement scale and fractions thereof and being formed with a projection 15 overlapping the measurement scale, the projection carrying an index mark 17 registering with a unit mark 19 on the second slide and extending to a point of registration with the indicia marks on the first slide; and the elongated indicia mark on the first slide extending to a point of registration with the indicia marks on the second slide.

As shown in the drawings, it is preferable to construct one slide such as the A slide so that its projection member is in close proximity to the scale on the base member. When constructed in this manner, the projection on the B slide must be elevated so that the projecting members will clear one another as they are moved in overlapping relation.

As a further refinement, one of the projecting members is mounted on its slide member for parallel reciprocating movement between the raised position and a position substantially in contact with the scale face. The projection is maintained in alignment by at least three pins 21, 22, and 23. A spring 25, such as a phosphorous bronze flat spring having a downwardly extending leg 27, and attached to the base by a screw 29 inserted through an oval shaped opening in the leg has been found to be most suitable.

For many purposes, it is desirable to construct the device of metal so that it is capable of withstanding rugged treatment. When thus constructed, it is desirable for ease in reading the scale to inset the first readings on the scale from the end.

Turning to the actual construction of the device, the base member is formed with a first tongue 31 extending at right angles to the longitudinal axis of the base member. In order to enable the slide to move over the entire scale, the tongue should extend over a substantial portion of the length of the base member. The base is also formed with a first shoulder 33 having a surface (which may be also indicated by the same number) which is parallel to the longitudinal axis of the base member which is angularly related to the primary surface of the base member and which mates with surface 34 on the A slide. This surface keeps the slide moving parallel to the base member. The base is also formed with a groove 35 having an axis parallel to the longitudinal axis of the base member which prevents the slide from separating from the base.

The base is formed with a second tongue 37 oppositely disposed to the first tongue and extending a substantial portion of the length of the base member for purposes of mounting the B slide. The base is formed with a second shoulder 39 having a surface parallel to the longitudinal axis of the base member angularly related to the primary surface of the base member mating with a surface 41 on the B slide.

The base member is formed with a second groove 43 positioned on the side disposed from the first groove and having an axis parallel to the longitudinal axis of the base member.

The A slide has an opening 45 for receiving the first tongue in close sliding fit and has a longitudinally extending projection 47 registering with the groove of the first tongue for holding the first slide to the base. The second slide, in like manner, has an opening 49 for receiving the second tongue in close sliding fit and also has an elongated projection 51 registering with the groove of the second tongue for holding the second slide to the base. Where the device is made of metal it may be desirable to form the slide from two main members 53, 54, 55, and 56 and assemble them with fasteners such as 57 and 58.

In order to more easily and quickly carry out subtraction functions, the base member may be provided with a second or S scale parallel to the first scale having indicia marks 59 representing at least one full unit and fractions thereof. The units of the second scale should be in reverse ascending order from the first scale as shown in FIGURE 1.

Subtraction is effected even more readily by affixing the second scale to a subtraction member or slide 61 which is mounted for sliding movement parallel to the linear direction of the first scale. The scale shown in the drawing shows markings from 0 to 5 and from 0 to 1. There may be more units depending on the length of the slide, the size of the numbers, and the accuracy to be obtained There could be less units which were spread further apart. In any event, the scale must match with the scale used on the A and B slides A thumb depress feature 62 consisting of a depression and etched lines in the S scale may be made to facilitate gripping the S slide.

The scales as shown in the drawings show the units divided into $\frac{1}{2}$'s, $\frac{1}{4}$'s, $\frac{1}{8}$'s, $\frac{1}{16}$'s, and $\frac{1}{32}$'s. The scale could be divided further into $\frac{1}{64}$'s or further if required for the type of work and accuracy being done. For such fine divisions, the scale would have to be expanded so that the true scale would be expanded 50, 100 or 200%.

The device could also be made from a lightweight material such as wood or plastic, and further the projections could be made of a transparent plastic or glass as shown in FIGURES 4 through 9. Since the construction of the metal and plastic devices is practically identical, similar parts are given the same number for ease in understanding. Use of the transparent material permits the projection arms to be made longer since there is no problem of covering up a scale and making it more difficult to read. For the transparent slides, the faces of the projections serving as the index line may be painted a dark color for ease in reading the scales.

The slides may be prevented from separating from the ends of the base by forming a small boss or inserting a pin 63 and 64 at each end of the base. A slot 65 formed in the slide permits the indexing line of the slide to be lined up automatically with the zero reading on the main scale.

The B slide can be prevented from separating from the base in the same manner or it could be made to interlock with the A slide.

In addition to the scales being for adding or subtracting linear measurements, the scale may also be calibrated in fractions of volumetric, weight or time readings. Thus time could be divided into hours, minutes, and seconds; volume could be calibrated in gallons, quarts and pints. The latter designations would be primarily useful in teaching children but it may also find other applications.

The operation of the device for adding is as follows: If for example one were to add the fractions $\frac{1}{2}$, $\frac{3}{8}$ and $\frac{1}{16}$, this could be accomplished by following the settings set forth in FIGURES 4, 5 and 6. In FIGURE 4, the index line of the A slide is set to the zero mark on the T scale. The B slide index is then moved to the figure $\frac{1}{2}$ on the A scale slide. Next, as shown in FIGURE 5, the A slide is moved so that the index line matches the number $\frac{3}{8}$ on the scale of the B slide. The final step is shown in FIGURE 6 where the B slide index is moved to the number $\frac{1}{16}$ on the A scale. The correct answer $\frac{15}{16}$ is then read on the T scale.

The subtraction operation may be carried out in several ways. The first way is shown in detail in FIGURES 7 and 8. If for example, it was desired to subtract $\frac{3}{8}$ from $\frac{1}{2}$, the 0 mark on the S scale would be moved to the number $\frac{1}{2}$ on the T scale. Next, the index line on the B slide is moved to the number $\frac{3}{8}$ on the S scale. The answer $\frac{1}{8}$ is read on the T scale. The above method is particularly useful where a series of fractions have been added and it is desired to subtract a single number from the sum of the fractions. The index of the B slide will be set at the minuend and it is a simple matter to slide the zero mark of the S scale to the B index.

Another method of subtracting is to place the index line of the A slide on the S slide corresponding with the minuend. The index line of the B slide is then matched with the A scale corresponding to the subtrahend. The answer is then read on the S scale.

The S scale as shown in the drawings reads from right to left, ascending to 5 and then starting over again and ascending to 1. This arrangement enables the user to subtract a number after performing a series of additions without sliding the tight hand of the S scale completely across the length of the base. Thus the zero on the left side of the S scale can be moved to the minuend as shown on the T scale after a series of additions. This is particularly useful if the sum of the fractions is less than the number 3 as shown on the T scale.

Another variation of the scale imprinted on the S scale is to repeat the divisions of one unit reading from right to left across the scale. Thus, reading from right to left, the scale would read, 0 to 1, 0 to 1, etc. The advantage of such a scale would be the ease in performing the subtraction operation after an addition operation since the S scale would not have to be moved very far as set forth above.

I claim:

1. An adding and subtracting device comprising:
   (a) an elongated base member having a primary surface for presenting linearly spaced indicia marks forming a measurement scale of a plurality of units and fractions thereof;
   (b) a first slide mounted on said elongated base member for parallel, coextensive movement along said scale and having linearly spaced indicia marks forming at least one unit of said measurement scale and fractions thereof and being formed with a projection overlapping said measurement scale, said projection carrying an elongated index mark registering with a unit mark on said first slide;
   (c) a second slide mounted on said elongated base member for parallel, coextensive movement along said scale and having linearly spaced indicia marks forming at least one unit of said measurement scale and fractions thereof and being formed with a projection overlapping said measurement scale, said projection carrying an index mark registering with a unit mark on said second slide and extending to a point of registration with the indicia marks on said first slide; and
   (d) said elongated indicia mark on said first slide extending to a point of registration with the indicia marks on said second slide.

2. A device as specified in claim 1 wherein:
   (a) one of said projections on said slides is elevated above the surface of said scale face for under-over movement of said projections permitting said slides to move freely along the entire length of said scale.

3. A device as specified in claim 2 wherein:
(a) one of said projecting members is mounted on its slide member for parallel reciprocating movement between the raised position and a position substantially in contact with said scale face; and
(b) a spring mounted on said slide biasing said projection to said raised position.

4. A device as specified in claim 1 wherein:
(a) the first indicia mark on said scale representing the beginning of said scale is spaced from the end of said elongated base member.

5. A device as specified in claim 1 wherein:
(a) said elongated base member is formed with a first tongue extending at right angles to the longitudinal axis of said base member a substantial portion of the length of said base member;
(b) said elongated base being formed with a first shoulder having a surface parallel to the longitudinal axis of said base member angularly related to said primary surface of said base member;
(c) said tongue being formed with a groove with an axis parallel to the longitudinal axis of said base member;
(d) said elongated base member being formed with a second tongue oppositely disposed to said first tongue and extending a substantial portion of the length of said base member;
(e) said base being formed with a second shoulder having a surface parallel to the longitudinal axis of said base member angularly related to said primary surface of said base member;
(f) said elongated base member being formed with a second groove positioned on a side disposed from said first groove and having an axis parallel to the longitudinal axis of said base member;
(g) said first slide having an opening for receiving said first tongue in close sliding fit and having a longitudinally extending face in sliding registration with said first shoulder surface for maintaining said first slide in parallel relation to said base member, and an elongated projection registering with the groove of said first tongue for holding said first slide to said base; and
(h) said second slide having an opening for receiving said second tongue in close sliding fit and having a longitudinally extending face in sliding registration with said second shoulder surface for maintaining said second slide in parallel relation to said base member, and an elongated projection registering with the groove of said second tongue for holding said second slide to said base.

6. A device as specified in claim 1 including:
(a) said base member having a second scale parallel to said first scale and having indicia marks representing at least one full unit and fractions thereof, the units of said second scale being in reverse ascending order from said first scale.

7. A device as specified in claim 6 wherein:
(a) said second scale is affixed to a subtraction member which is mounted on said elongated base member for sliding movement parallel to the linear direction of said first scale.

8. A device as specified in claim 1 wherein said projections on said first and second slides are transparent.

9. A device as specified in claim 8 wherein:
(a) one of said projections on said slides is elevated above the surface of said scale face for under-over movement of said projections permitting said slide to move freely along the entire length of said scale;
(b) said elevated projecting member is mounted on its slide member for parallel reciprocating movement between the raised position and a position substantially in contact with said scale face; and
(c) a spring mounted on said slide biasing said projection to said raised position.

10. A device as specified in claim 9 including:
(a) said elongated member having a second scale parallel to said first scale and having indicia marks representing at least one full unit and fractions thereof, and being located in linear registration with a unit of said first scale, the units of said second scale being in reverse ascending order from said first scale.

References Cited

UNITED STATES PATENTS

| | | | |
|---|---|---|---|
| 732,072 | 6/1903 | Haskell et al. | 235—61 |
| 1,579,706 | 4/1926 | Hodge | 235—70 |
| 3,272,431 | 9/1966 | Dablo | 235—69 |

STEPHEN J. TOMSKY, Primary Examiner

U.S. Cl. X.R.

35—31